United States Patent
Straubinger et al.

(10) Patent No.: US 11,035,082 B2
(45) Date of Patent: Jun. 15, 2021

(54) CONSTRUCTION REINFORCEMENT WITH PROTRUDING REINFORCEMENTS

(71) Applicant: NV Bekaert SA, Zwevegem (BE)

(72) Inventors: Peter Straubinger, Horb a.N. (DE); Henk Cornelus, Avelgem (BE)

(73) Assignee: NV BEKAERT SA, Zwevegem (BE)

( * ) Notice: Subject to any disclaimer, the term of this patent is extended or adjusted under 35 U.S.C. 154(b) by 0 days.

(21) Appl. No.: 16/338,135

(22) PCT Filed: Oct. 2, 2017

(86) PCT No.: PCT/EP2017/074992
§ 371 (c)(1),
(2) Date: Mar. 29, 2019

(87) PCT Pub. No.: WO2018/086796
PCT Pub. Date: May 17, 2018

(65) Prior Publication Data
US 2020/0032462 A1    Jan. 30, 2020

(30) Foreign Application Priority Data

Nov. 9, 2016   (EP) ..................................... 16197929

(51) Int. Cl.
*E01C 7/00*        (2006.01)
*E01C 7/18*        (2006.01)
(Continued)

(52) U.S. Cl.
CPC .............. *E01C 7/185* (2013.01); *E01C 7/187* (2013.01); *B32B 5/022* (2013.01); *E01C 11/165* (2013.01);
(Continued)

(58) Field of Classification Search
CPC .......... E01C 5/012; E01C 5/022; E01C 7/185; E01C 7/187; E01C 11/165; E01C 2201/167; E04C 5/012; B32B 5/022
(Continued)

(56) References Cited

U.S. PATENT DOCUMENTS 3,346,219 A  *  10/1967  Salyer ....................... E01C 5/20
                                                    244/114 R
3,765,783 A  *  10/1973  Wager ....................... E01F 5/00
                                                    404/2
(Continued)

FOREIGN PATENT DOCUMENTS

JP      2002-101754      4/2002
WO        01/73205      10/2001
(Continued)

OTHER PUBLICATIONS

International Search Report dated Nov. 22, 2017 in International Application No. PCT/EP2017/074992.
(Continued)

*Primary Examiner* — Raymond W Addie
(74) *Attorney, Agent, or Firm* — Wenderoth, Lind & Ponack, L.L.P.

(57) ABSTRACT

A fabric (10, 20, 30) adapted for the reinforcement of constructions such as of roads or pavements has a fabric width W2 in a transverse direction. The fabric (10, 20, 30) comprises a carrier (12, 22, 32). The fabric further comprises reinforcement elements (14, 24', 24", 34) extending over the fabric width and being fixed or bound to the carrier (12, 22, 32). The carrier (12, 22, 32) has a carrier width W1 that is smaller than the fabric width W2 so that the reinforcement elements (14, 24', 24", 34) protrude out of the carrier (12,
(Continued)

22, 32). The advantage is that when two neighbouring fabrics (40, 44) overlap, it is possible to avoid a double layer of carriers.

15 Claims, 4 Drawing Sheets

(51) Int. Cl.
  *B32B 5/02* (2006.01)
  *E01C 11/16* (2006.01)
  *E04C 5/01* (2006.01)
(52) U.S. Cl.
  CPC ........ *E01C 2201/167* (2013.01); *E04C 5/012* (2013.01)
(58) Field of Classification Search
  USPC .............................. 404/17–24, 27–31, 72, 75
  See application file for complete search history.

(56) References Cited

U.S. PATENT DOCUMENTS

| | | | | |
|---|---|---|---|---|
| 4,629,358 A * | 12/1986 | Springston | ................ | E01C 5/22 404/35 |
| 4,896,993 A * | 1/1990 | Bohnhoff | .................. | E01C 5/20 404/33 |
| 5,273,373 A * | 12/1993 | Pouyer | .................... | E01C 9/086 404/35 |
| 5,529,438 A * | 6/1996 | Carriker | .................... | B09B 1/00 405/129.75 |
| 6,361,245 B1 * | 3/2002 | Polivka | ................... | E01C 9/086 404/32 |
| 7,144,190 B1 * | 12/2006 | Lyons | ..................... | E01C 11/10 404/31 |
| 7,175,362 B2 * | 2/2007 | Carr | ...................... | A01M 29/32 404/1 |
| 7,207,743 B2 * | 4/2007 | Polivka, Jr. | ............. | E01C 9/086 404/73 |
| 7,232,276 B2 * | 6/2007 | Oka | .......................... | E01C 3/06 404/31 |
| 7,687,104 B2 * | 3/2010 | Moon | ..................... | C08L 95/00 404/17 |
| 7,727,609 B1 * | 6/2010 | Crasno | ..................... | A63B 6/00 428/60 |
| 8,142,102 B2 * | 3/2012 | Wheatley | .............. | E01C 11/005 404/31 |
| 8,361,261 B2 * | 1/2013 | Van Fossen | ........ | B29C 65/5028 156/182 |
| 8,662,787 B2 * | 3/2014 | Sawyer | ................... | E01C 3/006 404/28 |
| 8,876,428 B2 * | 11/2014 | Pallenberg | ............ | E01C 11/005 404/31 |
| 2004/0120765 A1 * | 6/2004 | Jones, IV | ............. | D04B 21/165 404/35 |
| 2012/0039667 A1 * | 2/2012 | White | ....................... | E01C 3/00 404/30 |
| 2012/0183746 A1 * | 7/2012 | Keene | ....................... | B32B 5/08 428/193 |
| 2014/0169877 A1 * | 6/2014 | Reising | ................... | E01C 13/00 404/27 |
| 2014/0170916 A1 | 6/2014 | Krasnoff et al. | | |

FOREIGN PATENT DOCUMENTS

| | | |
|---|---|---|
| WO | 2014/161930 | 10/2014 |
| WO | 2014/161931 | 10/2014 |
| WO | 2016/062458 | 4/2016 |

OTHER PUBLICATIONS

Written Opinion of the International Searching Authority dated Nov. 22, 2017 in International Application No. PCT/EP2017/074992.

* cited by examiner

CONSTRUCTION REINFORCEMENT WITH PROTRUDING REINFORCEMENTS

TECHNICAL FIELD

The invention relates to a fabric adapted for the reinforcement of constructions such as roads or pavements, and more particularly for the reinforcement of asphalt roads or pavements. The invention also relates to a method of renovating an existing road or pavement.

BACKGROUND ART

WO-A1-2014/161930 discloses a fabric for reinforcing roads or pavements. The fabric has assemblies of grouped metal filaments that are coupled to or integrated in a carrier.

WO-A1-2014/161931 discloses an alternative of such a fabric. This fabric comprises assemblies of grouped metal filaments that are held in a parallel position.

WO-A1-2016/062458 discloses yet another alternative of such a fabric. This fabric is provided with reinforcement elements with weakened zones or spots in order to facilitate the later breaking up of the pavement and to allow easier recycling of the reinforcing elements.

The above-mentioned prior art fabrics are anti-reflective cracking (ARC) interlayer fabrics, e.g. metal or steel-based anti-reflective cracking interlayer fabrics that fit very well for asphalt road renovation. These fabrics allow a fast and relative easy renovation of the road at a rather low cost, since the existing pavement is used as base. This already existing pavement has joints or cracks that might get reflected in the asphalt overlayer or top layer after renovation. To delay this reflection as long as possible, an ARC interlayer fabric is added before applying the asphalt.

Adhesion both downwards to the existing pavement or road and upwards to the asphalt overlayer is crucial for the performance and lifetime of the road or pavement innovation. This is the reason why a so-called tack coat or bitumen layer is first laid down on the existing pavement or road and the fabric is then rolled out and pushed a little bit into the tack or bitumen layer.

Experience, however, has shown that adhesion problems may persist despite the use of the tack coat layer.

US 2014/0170916 A1 discloses a non-woven cementitious composite for reinforcement of pavements or roads. This non-woven composite comprises several layers, amongst others an impermeable layer that may have reinforcements and a structure layer. The impermeable layer may extend laterally outward the structure layer.

DISCLOSURE OF INVENTION

It is a general object of the present invention to overcome the problems of the prior art.

It is a particular object of the present invention to improve the adhesion of a reinforcement fabric when reinforcing a road or pavement.

It is yet another object of the present invention to provide practical and visible means to improve the adhesion.

Viewed from another aspect of the invention, it is also an object to improve the stress distribution in reinforcement elements.

According to a first aspect of the invention, there is provided a fabric adapted for the reinforcement of constructions such as roads or pavements. This fabric has a fabric width in a transverse direction. The fabric comprises a carrier and further comprises discrete and spaced apart reinforcement elements extending within the fabric width and being fixed or bound to the carrier. The carrier has a carrier width that is smaller than the fabric width so that the reinforcement elements protrude out of the carrier.

It is hereby understood that the fabric may also comprise other reinforcing elements, e.g. longitudinal, transverse or obliquely arranged reinforcement elements, which do not protrude or extend out of the carrier.

As mentioned the reinforcement elements are discrete and spaced apart. The distance between two neighbouring reinforcement elements ranges from 5 mm to 90 mm, e.g. from 10 mm to 80 mm, e.g. from 20 mm to 70 mm.

The advantage of the invention can be explained as follows. In most cases the fabric width is smaller than the width of the road or the pavements to be reinforced. Hence, two or more fabrics are needed to cover the whole road or pavement. In order to guarantee that loads are transmitted over the whole width of the road or that stresses are distributed to avoid stress peaks, there must be some overlapping between two adjacent fabrics.

In the prior art fabrics the carrier width is equal or about equal to the fabric width. This means that in the overlapping zones, two levels of carrier are present. In order to realize a good adhesion in the overlapping zone, the overlapping zone needs to be foreseen with extra tack coat. Due to practical reasons this step is often neglected in reality resulting in poor adhesion where there is an overlap or double layer of carrier. So the tack coat or bitumen layer has not been able to adhere to both levels of carrier, which has led to the adhesion problems mentioned above.

In contrast with the prior art fabrics, the invention fabric has a carrier width that is smaller than the fabric width. So at the longitudinal sides of the fabric, zones are present without a carrier with only reinforcing elements. As a result, zones of overlapping can be made with only one level of carrier present or without carrier, so that the tack coat or bitumen layer can easily realize a good adhesion.

The carrier in the fabric may be a non-woven or a plastic grid or any other suitable material. The nonwoven may be of polyethylene, polypropylene, polyethylene terephtalate, polylactic acid, polyamide, . . . or combinations thereof. The nonwoven may be spunbond, needle-punched, spunlaced. The plastic grid may be made of polyethylene, polypropylene, polyethylene terephtalate, polylactic acid, polyamide, . . . or combinations thereof. The plastic grid may be woven, extruded, or thermobonded. The advantage of a carrier is dimensional stability together with a lightweight open structure. The non-woven version has the advantage that the tack coat which is applied as first layer above the road to be renovated, may penetrate in the carrier and thus assures a good adhesion during installation. The plastic grid has the advantage that it is widely available and is cheap.

The function of the carrier is to facilitate installation. The carrier keeps the discrete and spaced apart reinforcement elements parallel during handling, storage, transport and installation. The carrier, as such, does not provide reinforcement.

The terms 'reinforcement elements extending over the fabric width' does not necessarily means that the reinforcement elements are oriented perpendicular to the longitudinal direction of the fabric. They may also be obliquely oriented.

The reinforcing elements may be metal wires, bundles of metal wires or metal cords, carbon fibers, synthetic fibers, basalt fibers, glass fibers or yarns made therefrom, extruded reinforcement elements . . . . Preference is given to steel cords since steel cords both have a high strength and flexibility due to its twisting of thin steel wires or steel filaments. The steel cords may be provided with weakened zones, e.g. in the form of brittle spots located along the length of the steel cords with distances between subsequent spots ranging from 10 cm to 100 cm. The brittle spots may be realized by welding. Another form of weakening the steel cords may be to apply a series of indentations along the length of the steel cords.

The reinforcement elements may be fixed or bound in various ways, e.g. by means of a glue or by means of a yarn.

Although the reinforcement elements may protrude at both sides, in a preferred embodiment of the first aspect of the invention, the transversal reinforcement elements protrude at only one longitudinal side of the fabric.

In another preferred embodiment of the first aspect of the invention, some of the reinforcement elements protrude at one longitudinal side of the fabric and the other longitudinal side of the fabric is provided with markings that serve to indicate a zone where overlapping should take place when laying down two fabrics next to each other on the tack coat layer.

Different ways of marking may be applied. A practical way of marking is by means of colours.

One way of colour marking is that the two to six longitudinal reinforcement elements in the marking zone have a colour different from the colour of the other elongated longitudinal reinforcement elements. This different colour may be obtained by painting or by applying a different coating with a differing colour, for example a brass or copper coating versus a zinc or a zinc aluminium coating. As a matter of another example, a polymer coating may be applied by means of emulsion or extrusion and the polymer may have a different colour.

Another way of colour marking is as follows: the fabric further comprises yarns for stitching the longitudinal reinforcement elements to the carrier. The yarns that are located in the marking zone have a colour different from the colour of the yarns in the rest of the carrier. For example, the yarns in the marking zone may have a red colour while the yarns in the rest of the carrier have a white colour.

Yet another way of colour marking is by marking the carrier: the carrier has in the marking zone a colour different from the colour of the rest of the carrier. Instead of a different colour another visually differing marking may also be applied.

Preferably the transversal reinforcement elements protrude out of the carrier over a protrusion width ranging from 40 mm to 450 mm, e.g. from 50 mm to 300 mm, e.g. from 50 mm to 200 mm. The protrusion width is measured here along a line perpendicular to the longitudinal direction of the fabric.

Also preferably the width of the marking zone ranges from 40 mm to 450 mm, e.g. from 50 mm to 300 mm, e.g. from 50 mm to 200 mm. The marking width is here also measured along a line perpendicular to the longitudinal direction of the fabric.

Most preferably the width of the marking zone does not differs very much from the protrusion width, i.e. the difference is less than 40 mm, e.g. less than 30 mm, e.g. less than 25 mm.

The fabric width may range from 1.0 m to 4.0 m, e.g. from 1.0 m to 3.0 m, e.g. from 1.0 m to 2.5 m. The protrusion width and width of the marking zones are preferably independent from the fabric width.

As already mentioned, preferable embodiments of the reinforcement elements are steel cords. Most preferably, those steel cords do not flare at their ends, particularly not a the ends which protrude out of the carrier.

Preferably the ends of the steel cord are welded together.

In order to facilitate transport, the invention fabric is preferably wound in a roll. This is made possible, amongst others, by the flexible nature of the reinforcement elements. Most preferably, a plastic is wound over the roll and the protruding parts of the reinforcement elements are kept inside the plastic during transport and handling.

According to another aspect of the invention, there is provided method of renovating an existing road or pavement. This method comprises the following steps:

a) providing a layer of a tack coat on the existing road or pavement;

b) providing a first roll of a first fabric according to the first aspect of the invention at one longitudinal side of the road or pavement, so that the reinforcement elements protrude out of the carrier of the fabric at least at the side opposite to the longitudinal side of the road or pavement;

c) unwinding the first fabric on the layer of tack coat along the one longitudinal side of the road or pavement whereby the reinforcement elements protrude at the side opposite to the one longitudinal side thus creating a longitudinal zone without carrier;

d) providing a second roll of a second fabric according to the first aspect of the invention, where the second fabric comprises a carrier and further comprises reinforcement elements fixed to the carrier;

e) unwinding the second roll so that the carrier or protruding reinforcing elements of the second fabric overlaps with the longitudinal zone of the first fabric without carrier.

In a preferable embodiment of the second aspect of the invention, the second fabric is a fabric according to first aspect of the invention with protruding reinforcement elements. The second roll of the second fabric is unwound so that its carrier is lying adjacent to the carrier of the first fabric.

So there are two general types of embodiment of the second roll. A first embodiment can have in the overlapping zone protruding or extending reinforcing elements. A second embodiment can have in the overlapping zone a carrier with a marking zone or a carrier without a marking zone. A combination of the two embodiments, carrier and protruding elements in the overlapping zone is also feasible.

BRIEF DESCRIPTION OF FIGURES IN THE DRAWINGS

MODE(S) FOR CARRYING OUT THE INVENTION

Figure 1:
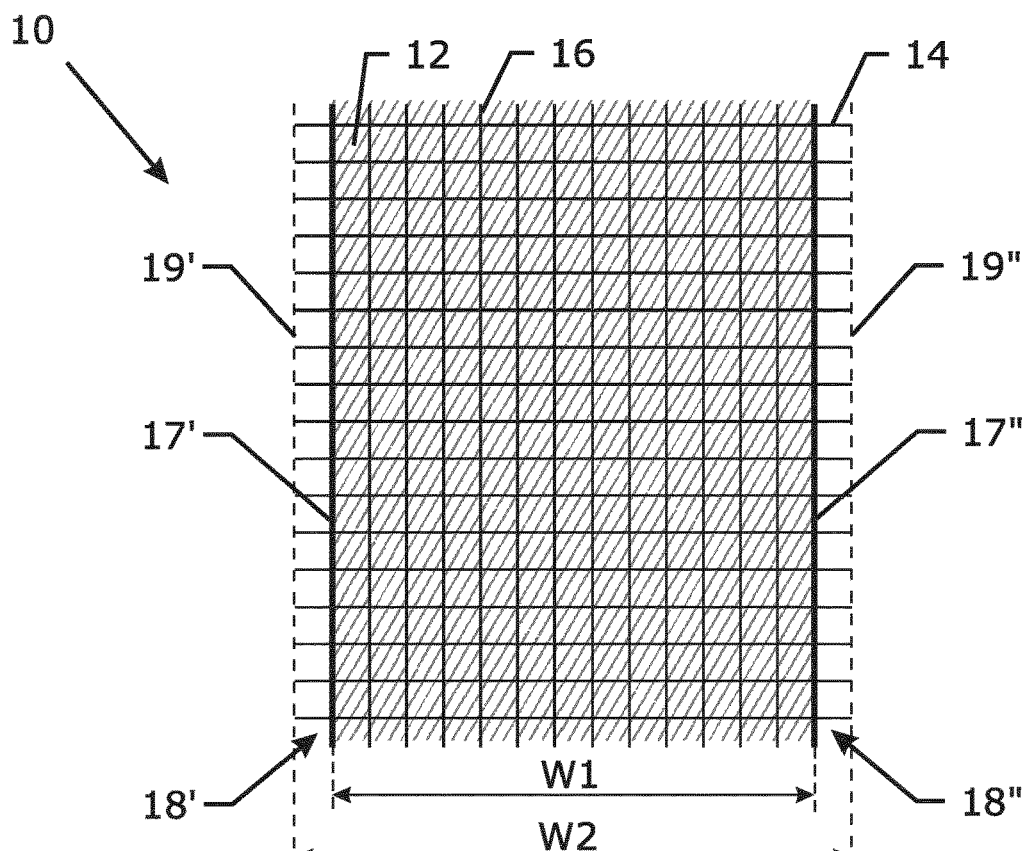
FIG. 1 is a top view of a fabric according to the first aspect of the invention where transverse reinforcement elements protrude at both sides of the fabric.

FIG. 1 is a top view of a first alternative of a fabric 10 according to the first aspect of the invention. The fabric 10 has a carrier 12 to which transverse reinforcing steel cords 14 are directly or indirectly bound. The fabric 10 has also longitudinal reinforcing steel cords 16.

Direct bonding of the transverse reinforcing steel cords 14 may be done by means of glue or by means of yarns. Indirect bonding may be realized as follows: The transverse reinforcing steel cords 14 are positioned under the longitudinal reinforcing steel cords 16 and the longitudinal reinforcing steel cords 16 are stitched by means of synthetic yarns to the carrier 12. This direct or indirect bonding is not necessarily limited to this first alternative and may be applied to other alternatives and embodiments.

The particularity of the first alternative fabric 10 is as follows: The carrier 12 has a width W1 that is smaller than the width W2 of the whole fabric. The carrier 12 has a left longitudinal side 17' and a right longitudinal side 17". The transverse reinforcing steel cords 14 protrude at the left side over a left zone 18' and extend until the dotted line 19' and the transverse reinforcing steel cords 14 protrude also at the right side over a left zone 18" and extend until the dotted line 19".

When renovating a road or pavement by means of fabric 10, other fabrics with or without protruding transverse reinforcement elements can be positioned slightly overlapping both at the left and at the right of fabric 10.

Figure 2:
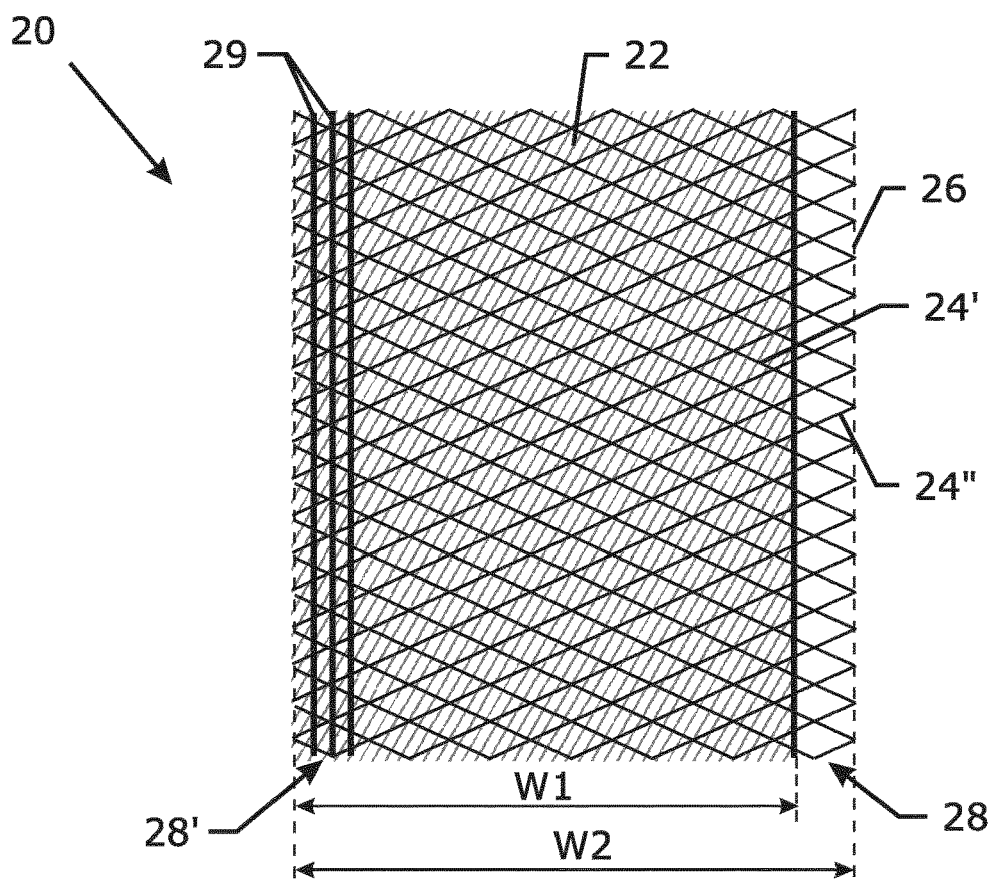
FIG. 2 and FIG. 3 are both top views of fabrics according to the first aspect of the invention where reinforcement elements protrude at only one side of the fabric.

FIG. 2 is a top view of a second alternative of a fabric 20 according to the first aspect of the invention. The fabric 20 has a carrier 22 to which reinforcing steel cords 24' and 24" are bound. The reinforcing steel cords 24' and 24" are obliquely arranged and form a diamond pattern. The width of the carrier 22 is W1, while the width of the fabric 20 is W2, which is greater than W1. The reinforcing steel cords 24' and 24" protrude at the right side out of the carrier 22 until the dotted lines 26 and thus form a right zone 28" without presence of a carrier 22.

At the left side a left zone 28' of about the same width as the right zone 28" has been marked by means of coloured synthetic yarns 29.

Figure 3:
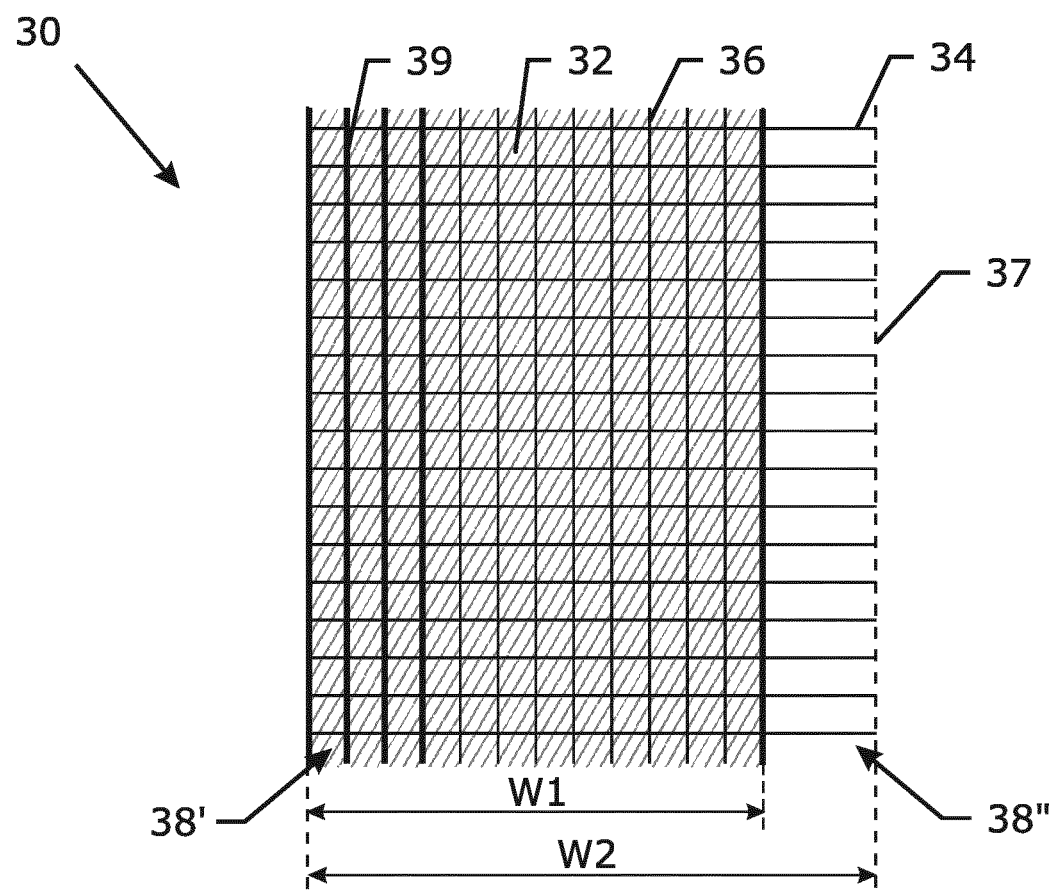

FIG. 3 is a top view of a third and preferable alternative of a fabric 30 according to the first aspect of the invention. The fabric 30 has a carrier 32 to which transverse reinforcing steel cords 34 are bound. Longitudinal reinforcing steel cords 36 are also present. The width of the carrier 32 is W2 and is smaller than the width of the fabric W1. The transverse reinforcing steel cords 34 extend beyond the carrier 32 until the dotted lines 37 thus creating a right zone 38" without presence of a carrier.

At the left side a left zone 38' of about the same width as the right zone 38" has been marked by means of coloured synthetic yarns 39.

The steel cords used as reinforcing elements preferably comprise steel filaments with a diameter ranging from 0.10 mm to 0.50 mm, most preferably from 0.20 mm to 0.40 mm. The steel filaments are preferably coated with a corrosion resistant metal layer such as zinc or a zinc alloy or with a corrosion resistant polymer coating such as polyvinylchloride or polyester. Preferably the number of steel filaments in such a steel cord is limited and ranges from two to twelve. Suitable steel cord constructions are 2×1, 3×1, 4×1, 1+6, 3+9.

The steel cords offer a double advantage.

A first advantage is that due to the small filament diameter and due to the twisted nature of the steel cords, the steel cords allow the fabric to be wound easily into a roll and to be unwound easily at the time of renovating a road or pavement. This is in contrast to the reinforcing mat disclosed in EP-B1-0 961 857, where the reinforcing elements are single wires with wire diameter of about 2.2 mm.

A second advantage is that due to the steel material the steel cords still have a sufficient stiffness that prevent the protruding steel cord ends from entangling with each other. This is in contrast with synthetic reinforcing elements which have a lower stiffness and where the protruding ends risk to be entangled with each other.

Figure 4:
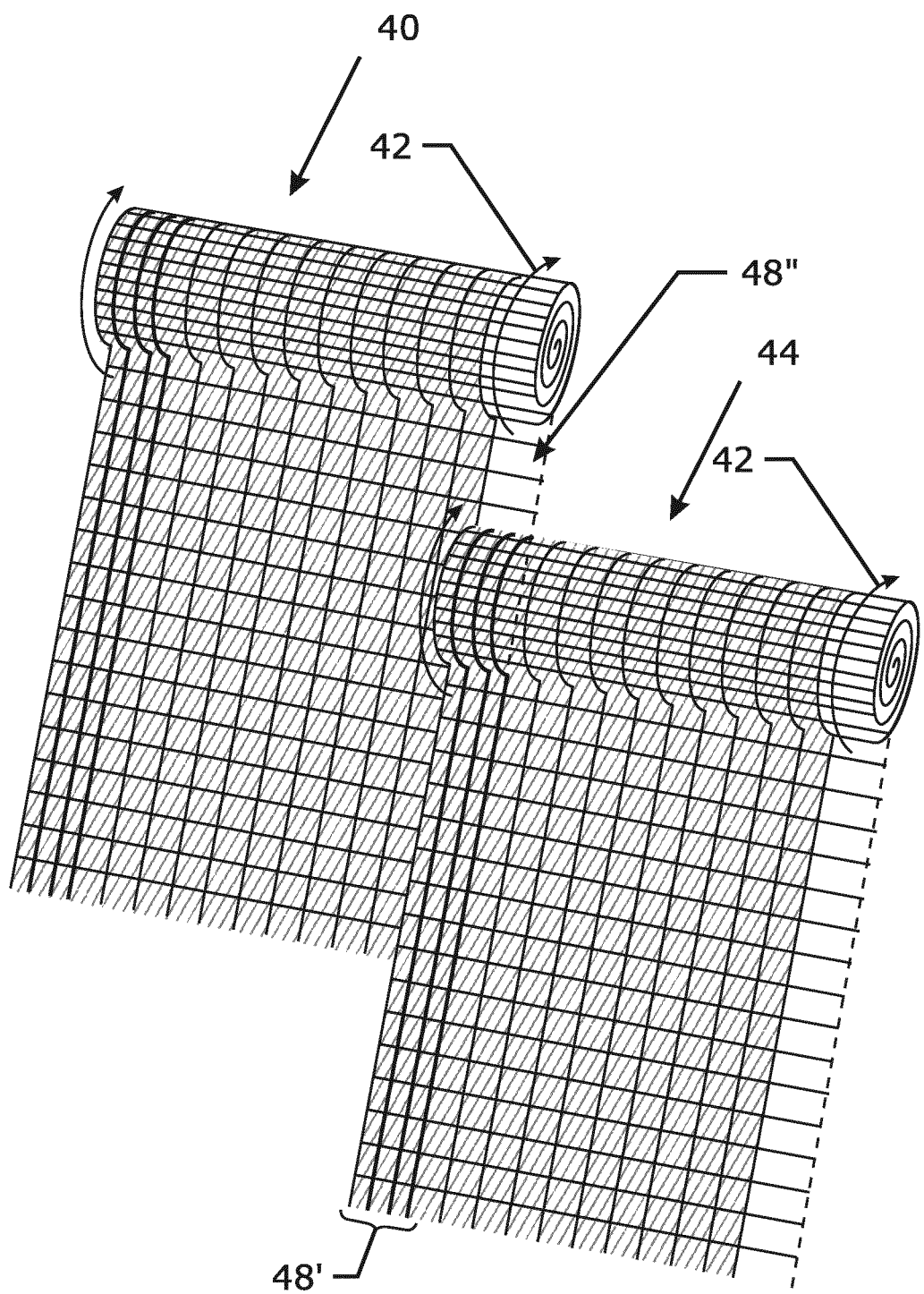
FIG. 4 is a perspective view of how two adjacent fabrics are installed when renovating a road or a pavement.

FIG. 4 is a perspective view of how two adjacent fabrics are installed when renovating a road or a pavement. First of all a tack coat or bitumen layer is deposited on the existing road or pavement (not shown). Thereafter, a first fabric 40 is unwound along the left edge or border of the road or pavement in the direction of arrow 42. This fabric 40 has protruding steel cord ends at the right side. Hereafter, a second fabric 44 is unwound in the direction of arrow 42. The second fabric 44 is positioned at the right side of the first fabric 40 and overlaps with the first fabric 40. A left zone 48' provided with a carrier and colour markings of the second fabric 44 is laid over the right zone 48" of the first fabric 40 without carrier and with protruding steel cord ends.

Depending upon the total width of the road or pavement, more fabrics will be unwound and will be partially overlapping with the already present right most fabric. The final fabric is preferably a fabric where the transverse reinforcing steel cords do not protrude out of the carrier.

Figure 5:
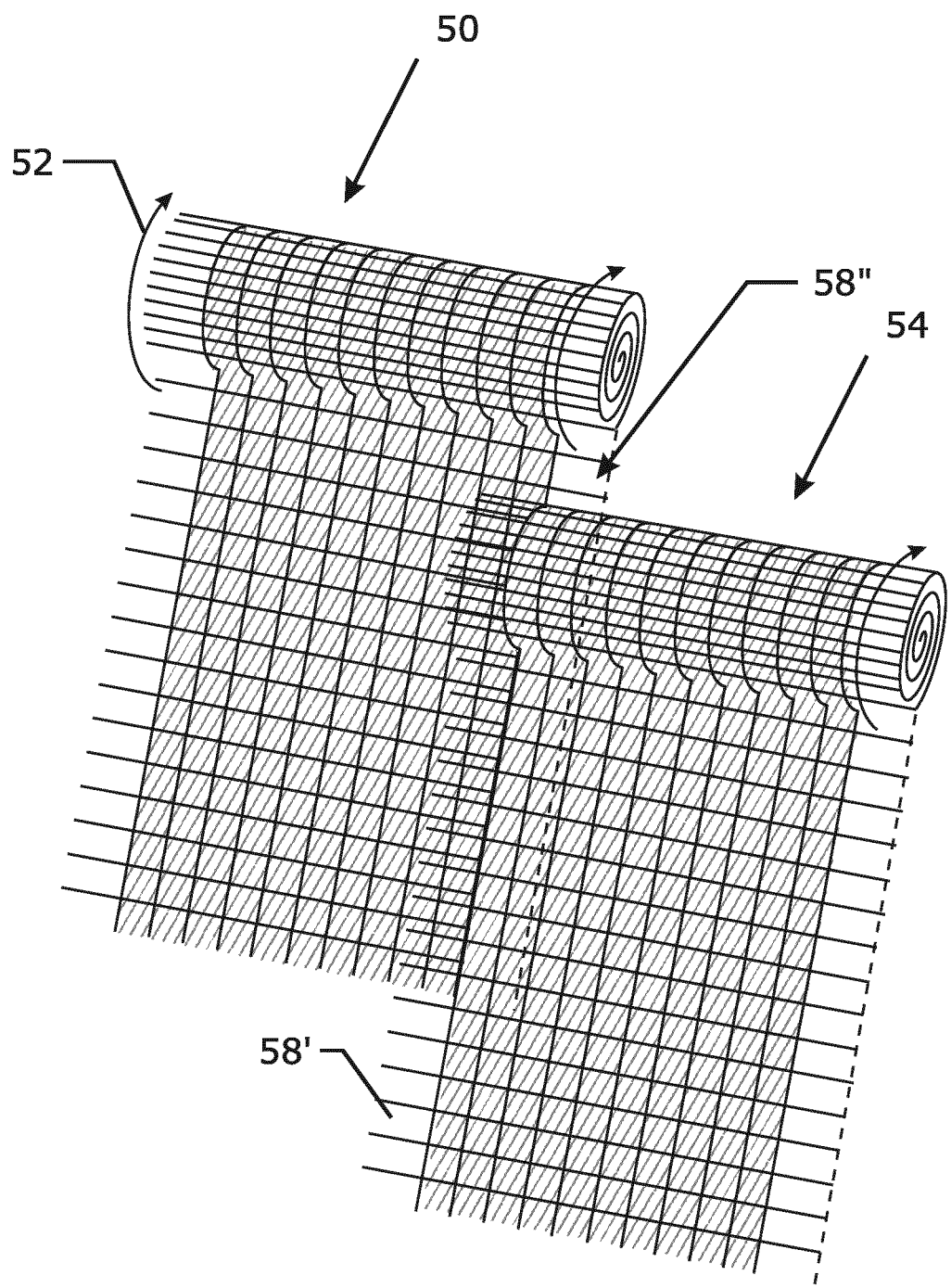
FIG. 5 is a perspective view of an alternative way of how two adjacent fabrics are installed when renovating a road or a pavement.

FIG. 5 is a perspective view of an alternative way how two adjacent fabrics are installed when renovating a road or a pavement. First of all a tack coat or bitumen layer is deposited on the existing road or pavement (not shown). Thereafter, a first fabric 50 is unwound along the left edge or border of the road or pavement in the direction of arrow 52. This first fabric 50 has protruding steel cord ends at both sides. Hereafter, a second fabric 54 is unwound in the direction of arrow 52. The second fabric 54 is positioned at the right side of the first fabric 50 and overlaps with the first fabric 50 without overlapping of the carrier of the first fabric 50 and the carrier of the second fabric 54. A left zone 58' provided with a protruding steel cords of the second fabric 54 is laid over the carrier of the first fabric 50. The right zone 58" of the first fabric 50 with protruding steel cord ends is lying under the carrier of the second fabric 54.

LIST OF REFERENCE NUMBERS 10 first alternative of fabric
12 carrier
14 transverse reinforcing steel cords
16 longitudinal reinforcing steel cords
17' left border of carrier
17" right border of carrier
18' left zone
18" right zone
19' left border of fabric
19" right border of fabric
W1 width of carrier
W2 width of fabric
20 second alternative of fabric
22 carrier
24', 24" reinforcing steel cords
26 right border of fabric
28' left zone
28" right zone
29 colour markings
30 third alternative of fabric
32 carrier
34 transverse reinforcing steel cords
36 longitudinal reinforcing steel cords
37 right border of fabric
38' left zone
38" right zone 39 colour markings
40 first, left fabric
42 arrow indicating direction of unwinding
44 second, right fabric
48' left zone of second right fabric
48" right zone of first left fabric
50 first, left fabric
52 arrow indicating direction of unwinding
54 second, right fabric
58' left zone of second right fabric
58" right zone of first left fabric

The invention claimed is:

1. A fabric adapted for the reinforcement of constructions, said fabric having a fabric width in a transverse direction, said fabric comprising only one level of carrier being a non-woven, said fabric further comprising discrete and spaced apart reinforcement elements extending within said fabric width and being fixed or bound to said carrier, said carrier having a carrier width that is smaller than said fabric width so that said reinforcement elements protrude out of said carrier, whereby zones of overlapping can be made with only one level of carrier present or without carrier, so that a tack coat or bitumen layer can realize adhesion with the reinforcement elements protruding out of said carrier.

2. The fabric according to claim 1, wherein said reinforcement elements are fixed or bound to said carrier over the whole carrier width.

3. The fabric according to claim 1, wherein some of said reinforcement elements protrude out of said carrier over a protrusion width as measured along a line perpendicular to the longitudinal sides, said protrusion width ranging from 40 mm to 400 mm.

4. The fabric according to claim 1, wherein said fabric has two longitudinal sides, at least some of said reinforcing elements protruding at both longitudinal sides of said fabric.

5. The fabric according to claim 1, wherein said fabric has two longitudinal sides, at least some of said reinforcing elements protruding at only one longitudinal side of said fabric.

6. The fabric according to claim 5, wherein the said fabric has a longitudinal side where no reinforcement elements protrude and which is provided with a zone that is marked.

7. The fabric according to claim 6, said zone that is marked having a marking width as measured along a line perpendicular to the longitudinal sides, said marking width ranging from 40 mm to 400 mm.

8. The fabric according to claim 7, wherein said marking width differs from said protrusion width in less than 40 mm.

9. The fabric according to claim 1, wherein said reinforcing elements are steel wires or steel cords.

10. The fabric according to claim 9, wherein said steel cords do not flare.

11. The fabric according to claim 9, wherein said steel cords are welded at their ends.

12. The fabric according to claim 1, said fabric being wound in a roll.

13. The fabric according to claim 12, said roll being enveloped by means of a plastic so that the protruding ends of the reinforcement elements are inside the plastic.

14. A method of renovating an existing road or pavement, said method comprising the following steps:
a) providing a layer of a tack coat on the existing road or pavement;
b) providing a first roll of a first fabric according to claim 1 at one longitudinal side of said road or pavement, some of the reinforcement elements protruding out of the carrier of said fabric at least at the side opposite to said longitudinal side of the road or pavement;
c) unwinding said first fabric on said layer of tack coat along said one longitudinal side of said road or pavement whereby some of the reinforcement elements protrude at the side opposite to said one longitudinal side thus creating a longitudinal zone without carrier;
d) providing a second roll of a second fabric, said second fabric comprising a carrier and further comprising reinforcement elements fixed to said carrier;
e) unwinding said second roll so that the carrier of said second fabric or protruding reinforcing elements of said second fabric overlaps with said longitudinal zone without carrier of said first fabric.

15. The method of renovating an existing road or pavement according to claim 14, wherein said second fabric is a fabric according to claim 1 and wherein during step e) said second roll of said second fabric is unwound so that its carrier is lying adjacent to the carrier of said first fabric.

* * * * *